United States Patent
Beukema et al.

(10) Patent No.: US 6,785,759 B1
(45) Date of Patent: Aug. 31, 2004

(54) SYSTEM AND METHOD FOR SHARING I/O ADDRESS TRANSLATION CACHING ACROSS MULTIPLE HOST BRIDGES

(75) Inventors: Bruce Leroy Beukema, Hayfield, MN (US); Timothy Carl Bronson, Vestal, NY (US); Ronald Edward Fuhs, Rochester, MN (US); Glenn David Gilda, Binghamton, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/569,574

(22) Filed: May 10, 2000

(51) Int. Cl.⁷ .............................................. G06F 1/00
(52) U.S. Cl. ................. 710/310; 710/308; 711/206; 711/202
(58) Field of Search ................. 710/305–306, 710/308, 310, 8–10, 22, 56, 57; 711/200–202, 205, 206, 207, 168; 713/100

(56) References Cited

U.S. PATENT DOCUMENTS

| | | | |
|---|---|---|---|
| 4,481,573 A | * 11/1984 | Fukunaga et al. | 710/100 |
| 4,855,905 A | * 8/1989 | Estrada et al. | 710/100 |
| 4,912,632 A | 3/1990 | Gach et al. | 364/200 |
| 5,263,142 A | 11/1993 | Watkins et al. | 395/425 |
| 5,613,153 A | 3/1997 | Arimilli et al. | 395/821 |
| 5,673,399 A | 9/1997 | Guthrie et al. | 395/308 |
| 5,749,093 A | 5/1998 | Kobayashi et al. | 711/139 |
| 5,796,979 A | 8/1998 | Arimilli et al. | 395/469 |
| 5,884,100 A | 3/1999 | Normoyle et al. | 395/872 |
| 5,898,888 A | 4/1999 | Guthrie et al. | 395/308 |
| 5,913,923 A | * 6/1999 | Dunlap et al. | 710/100 |
| 6,003,106 A | 12/1999 | Fields et al. | 710/129 |
| 6,049,841 A | * 4/2000 | Fields, Jr. et al. | 710/28 |
| 6,098,113 A | * 8/2000 | Heil et al. | 710/306 |
| 6,173,383 B1 | * 1/2001 | Casamatta | 711/202 |
| 6,230,219 B1 | * 5/2001 | Fields, Jr. et al. | 710/22 |
| 6,457,068 B1 | * 9/2002 | Nayyar et al. | 710/3 |

FOREIGN PATENT DOCUMENTS

JP          10-320278          12/1998          ........... G06F/12/08

* cited by examiner

Primary Examiner—Paul R. Myers
Assistant Examiner—Raymond N Phan
(74) Attorney, Agent, or Firm—Shelley M Beckstrand (57) ABSTRACT

A processor system includes an I/O bus to host bridge in which I/O address translation elements are shared across multiple I/O bus bridges. A TCE manager is provided for retaining in cache a TCE entry associated with a discarded channel for association with a new channel responsive to a subsequent read request for a memory page referenced by the TCE entry.

23 Claims, 5 Drawing Sheets

SYSTEM AND METHOD FOR SHARING I/O ADDRESS TRANSLATION CACHING ACROSS MULTIPLE HOST BRIDGES

CROSS REFERENCES TO RELATED APPLICATIONS

U.S. patent application Ser. No. 09/569,059 filed concurrently herewith and entitled "SYSTEM AND METHOD FOR SUPPORTING ACCESS TO MULTIPLE I/O HUB NODES IN A HOST BRIDGE" is assigned to the same assignee hereof and contains subject matter related, in certain respect, to the subject matter of the present application. The above identified patent application is incorporated herein by reference.

BACKGROUND OF THE INVENTION

1. Technical Field of the Invention

This invention pertains to an I/O bus to host bridge in a processor system. PCI/host bridge apparatus and method in which at least one bridge shares a common TCE cache between DMA reads and writes.

2. Background Art

A PCI host bridge provides an interconnect between an I/O subsystem and one or more processors in a processing system. (See, "PCI Local Bus Specification" Revision 2.2, Dated Dec. 18, 1998.) A host bridge typically provides data buffering capabilities for transferring read and write data between the I/O subsystem and the processors. Read and write commands or transactions that originate on the PCI bus and are destined for system memory are typically referred to as DMAs.

A PCI host bridge may also provide a means of translating addresses from a PCI memory address space to a system memory address space. A host bridge chip may provide a hardware mechanism to fetch table entries from system memory which describe how to map PCI addresses into system memory addresses. The host bridge uses a table entry to determine the system memory location to which a DMA operation will be directed.

Previous host bridges have combined the function of the DMA read data buffering and translation table lookup into a read "channel". These channels are a partitioning of a finite data buffer resource. A DMA read operation is allocated to one of these channels which holds both the translation table entry and the associated data buffer. The read channel can act as a cache for DMA read data and the translation table entry, which means that the channel can be accessed multiple times by separate DMA read transactions. This read channel is subject to reallocation due to the finite buffering resources available. When reallocation occurs, both the buffered data and the associated translation table entry are lost.

DMA writes also require allocation of a data buffer and a translation table entry repository. DMA write data are not cached but are merely buffered to provide the capability of "posting" the write and freeing the PCI bus earlier than otherwise possible if buffering were not provided. The translation table entries for DMA writes, however, are kept in a cache. This cache is separate from the translation table entries that are kept for the DMA read channels.

U.S. Pat. No. 6,003,106 by Guthrie et al relates to checking cached DMA read data against new DMA read data in a coherency mechanism designed to avoid the use of stale read data. Guthrie does not allow multiple usage of translation control elements by multiple DMA read channels, nor allow sharing of a TCE caching mechanism between multiple I/O buses.

It is an object of the invention to provide an improved PCI host bridge apparatus and method.

It is a further object of the invention to provide a PCI host bridge apparatus and method which more efficiently utilizes limited resources available for caching translation control entries (TCEs).

It is a further object of the invention to provide a PCI host bridge apparatus and method in which cached TCEs are allocated to DMA reads or writes based on dynamic usage rather than fixed at design implementation.

It is a further object of the invention to provide a PCI host bridge apparatus and method in which reallocation of a read channel does not necessarily result in the loss of a TCE.

It is a further object of the invention to provide a PCI host bridge apparatus and method in which repeated reads or continued reads do not necessarily suffer the latency of re-fetching a TCE when a channel reallocation occurs between read attempts.

It is a further object of the invention to provide a PCI host bridge apparatus and method through which an increased maximum sustained data rate may be achieved.

It is a further object of the invention to provide a PCI host bridge apparatus and method wherein DMA reads and writes that use the same TCE require only a single TCE fetch.

SUMMARY OF THE INVENTION

In accordance with the invention, a system and method is provided for sharing I/O address translation elements across multiple I/O bus bridges. A TCE manager is provided for retaining in cache a TCE entry associated with a discarded channel or associated with a previously completed write for association with a new channel responsive to a subsequent read request for a memory page referenced by the TCE entry or for use by a subsequent write operation to a memory page referenced by the TCE entry.

Other features and advantages of this invention will become apparent from the following detailed description of the presently preferred embodiment of the invention, taken in conjunction with the accompanying drawings.

BEST MODE FOR CARRYING OUT THE INVENTION

Figure 1:
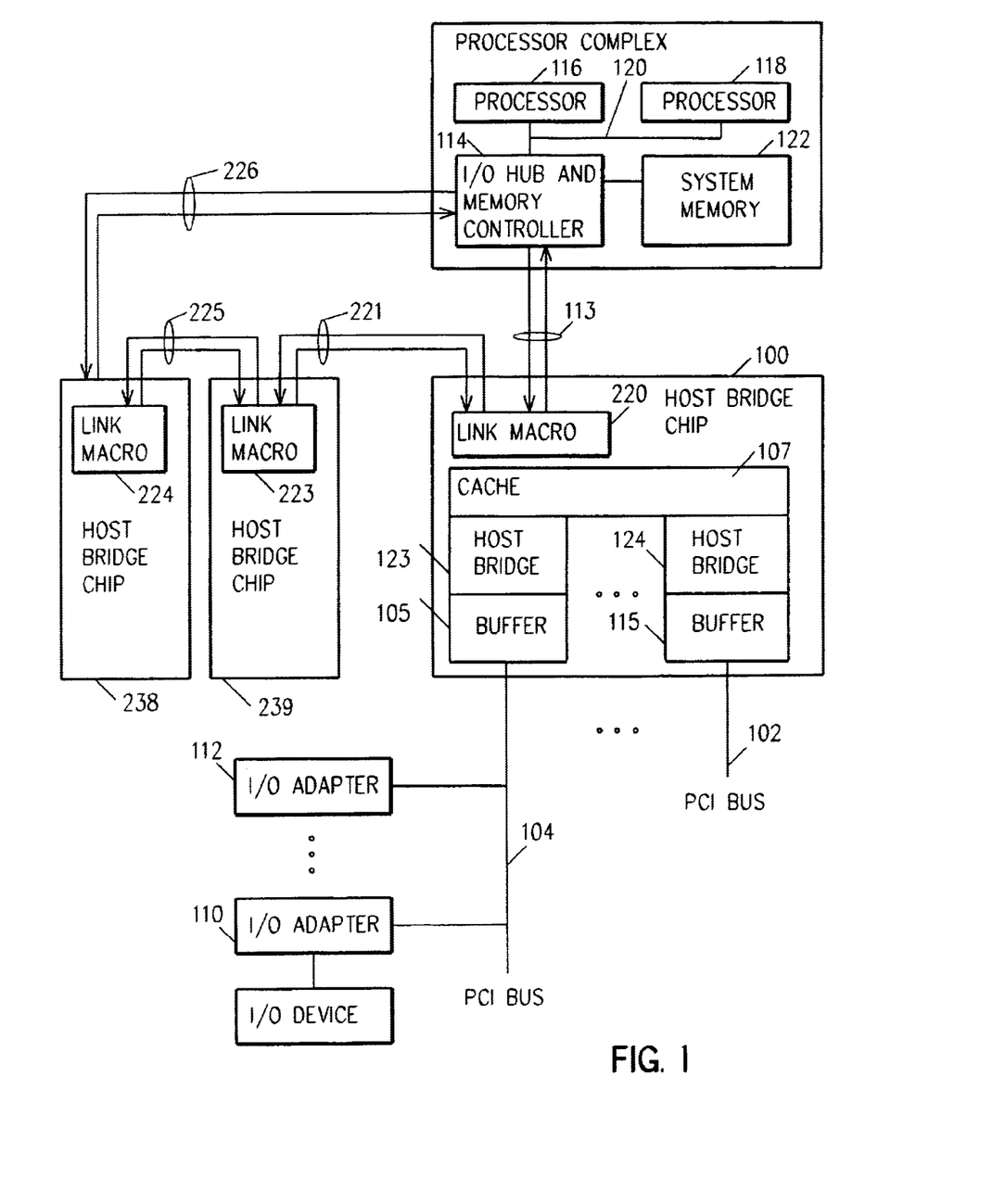
FIG. 1 is a high level system diagram showing a a processing system including a host bridge in accordance with the preferred embodiment of the invention.

Referring to FIG. 1, PCI host bridge 100 is connected to a plurality I/O adapters 110–112 (only two are shown) over PCI busses 102 and 104, and over bridge/hub link 113 via I/O hub and memory controller 114 to system memory 122 and to processors 116, 118 over processor bus 120. See, "PCI Local Bus Specification" Revision 2.2, Dated Dec. 18, 1998. This invention is also applicable to other bus architectures, such as a PCI-X host bridge. PCI-X is described in "PCI-X Addendum to the PCI Local Bus Specification" Revision 1.0, Dated Sep. 22, 1999. The exemplary embodiment described hereafter is in accordance with the PCI architecture, but chips using this invention may also implement PCI-X in addition to PCI.

Link 113 (as also link 221) is a high speed link (HSL), a high-speed interconnect which utilizes a packetized protocol to communicate between the various endnodes. The endnodes which inter-communicate across HSL include processor complexes (sometimes referred to as CEC units) as well as system I/O drawers, or nodes, and can operate in either a switched fabric or a looped topology. The HSL protocol is capable of supporting alternate, redundant data paths between endnodes with automatic hardware switchover between the alternate data paths.

Host bridge chip 100 has multiple host bridge functions, or bridge functional units, 123, 124. Thus, each PCI bus 102, 104 has a host bridge 124, 123 and buffer function 115, 105 associated with it.

Bridge 100 provides a means for translating addresses from a PCI memory address space including I/O adapters 110–112 to a system memory 122 address space. Bridge chip 100 includes a translation table cache 107 and, for each host bridge 123, 124, a corresponding data buffer 105, 115. Translation elements, or entries in translation table (otherwise known as translation control entry, or TCE) cache 107 and data buffer 105 or 115 for DMA reads and writes involve separate resources even though they are allocated for the same operation.

One aspect of the invention is to treat TCE cache 107 caching as completely separate from the data buffer 105 buffering, so that a common TCE cache 107 is shared between DMA reads and writes. Information is maintained in TCE cache 107 which associates a given entry in the cache with the appropriate DMA read or write operation, or channel, and its data buffers 105. This new organization results in more efficient utilization of the limited resources available for caching TCEs. The amount of TCE cache 107 entries allocated to DMA reads or writes is based on dynamic usage rather than fixed at design implementation. Furthermore, reallocation of a read channel (to be described hereafter in connection with FIGS. 2 and 3) does not necessarily result in the loss of a TCE cache 107 entry. This is an important advantage in that repeated reads or "continued" reads do not necessarily suffer the latency of re-fetching a TCE when a channel reallocation occurs between read attempts. The effect is an increase in the maximum sustained data rate through host bridge 100. DMA reads and writes that use the same TCE cache 107 also require only a single TCE fetch rather than multiple fetches as in the prior art.

Another aspect of the invention is the sharing of a TCE cache 107 amongst multiple PCI host bridges 123, 124.

A host bridge chip 100 can accommodate several PCI interfaces 102, 104, with each interface providing a host bridge function. This aspect of the invention makes the TCE cache 107 even more efficient by sharing it with all of the host bridge 100 functions. A pointer is added to the TCE cache 107 to indicate which host bridge 123, 124 owns the TCE cache entry. The amount of TCE cache 107 entries allocated to a PCI/host bridge (PHB) 123, 124 is based on dynamic usage rather than fixed at design implementation.

In accordance with a preferred embodiment of the invention, a host bridge chip 100 is provided which provides a host bridge function for a plurality, such as three, PCI busses 102, 104 (one 32 bit, two 64 bit, only two of which are illustrated) connected to two bridge/hub links 113 and 221. The links are connected to a hub chip 114 that connects to the processor bus 120; the hub chip may or may not also have an integrated memory controller. These links correspond to the connection 113 between host bridge 100 and I/O hub and memory controller 114 functions. A bridge/hub link 113 is a bidirectional, packetized interface, such as one that supports peak data rates of 500 megabytes/second. The architecture of link 113 is further described in co-pending patent application, Ser. No. 09/569,059 (IBM docket END9 2000 0055 US1) in connection with the packet format of FIG. 6.

The PCI busses 102, 104 are all capable of running at 66 MHz and also support dual-address-cycle (DAC) capability where host bridge 100 is the PCI bus target.

Figure 5:
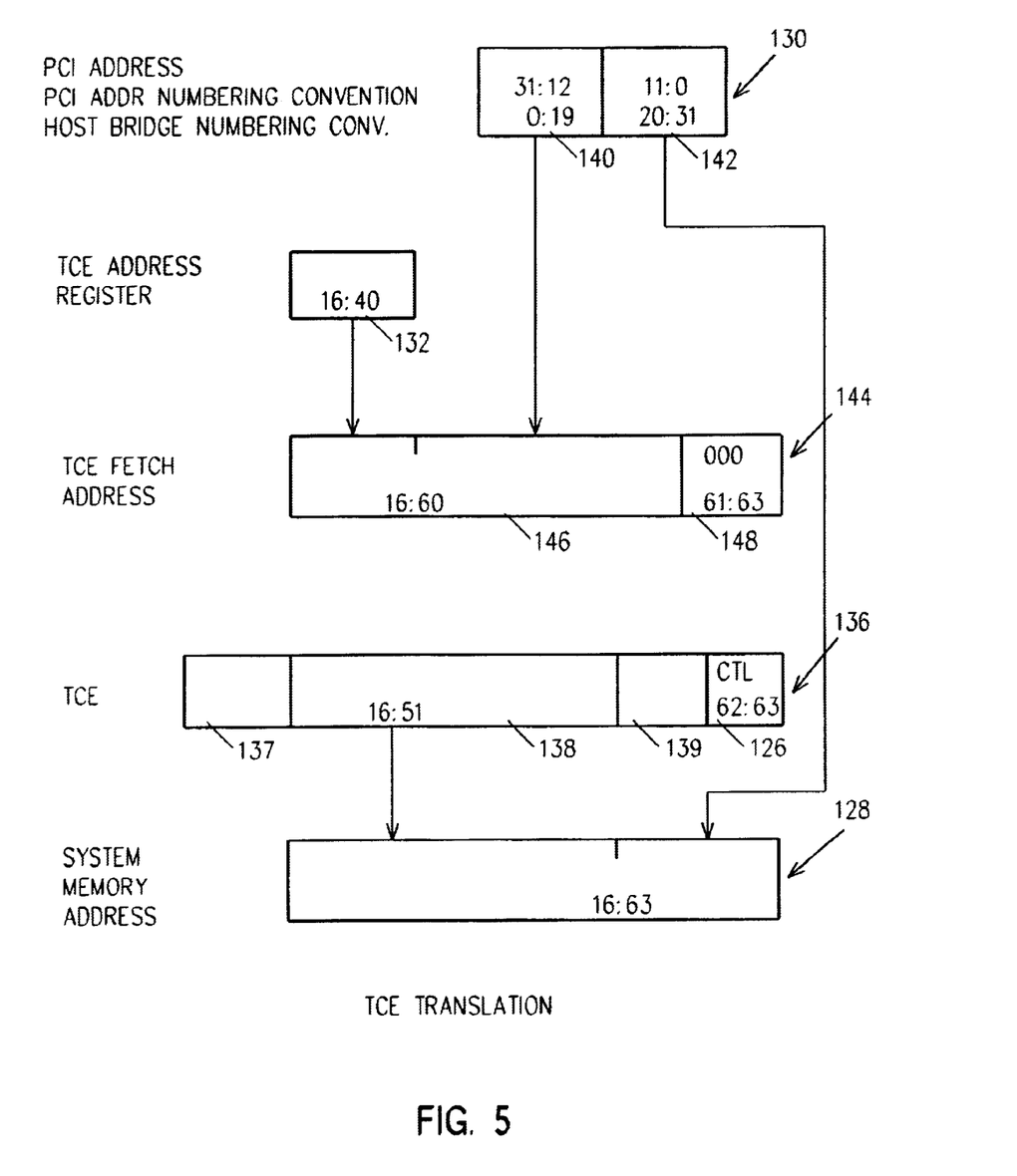
FIG. 5 is a diagram illustrating TCE translation.

Referring to FIG. 5, host bridge chip 100 provides an address translation function between the PCI address space and memory address space referred to as TCE (translation control entry) translation. A TCE address register 132 is provided for each host bridge function 123, 124 (FIG. 1) which is a pointer to the origin of the TCE table in system memory 122 (FIG. 1). The TCE table is a collection of TCE's 136. Entries from the table in memory 122 are looked up, fetched, and kept in TCE cache 107 for subsequent use.

The high order 20 bits 140 of a PCI address 130 are appended to the TCE address register 132 origin to form a TCE 8 byte fetch address 144. A TCE 136 is returned by the TCE fetch across the bridge/hub link 113 and a system memory address 128 is formed with the high order address bits coming from the TCE 136 field 138 and the low order bits coming from the original PCI address 130 field 142. Area 137 of TCE 136 contains bits that are unused from the TCE 136 (the preferred embodiment supports 48 bits of system memory addressability) and area 139 of TCE 136 includes reserved bits. Field 126 bits 62:63 of TCE 136 are control bits that provide page protection capability.

Figure 2:
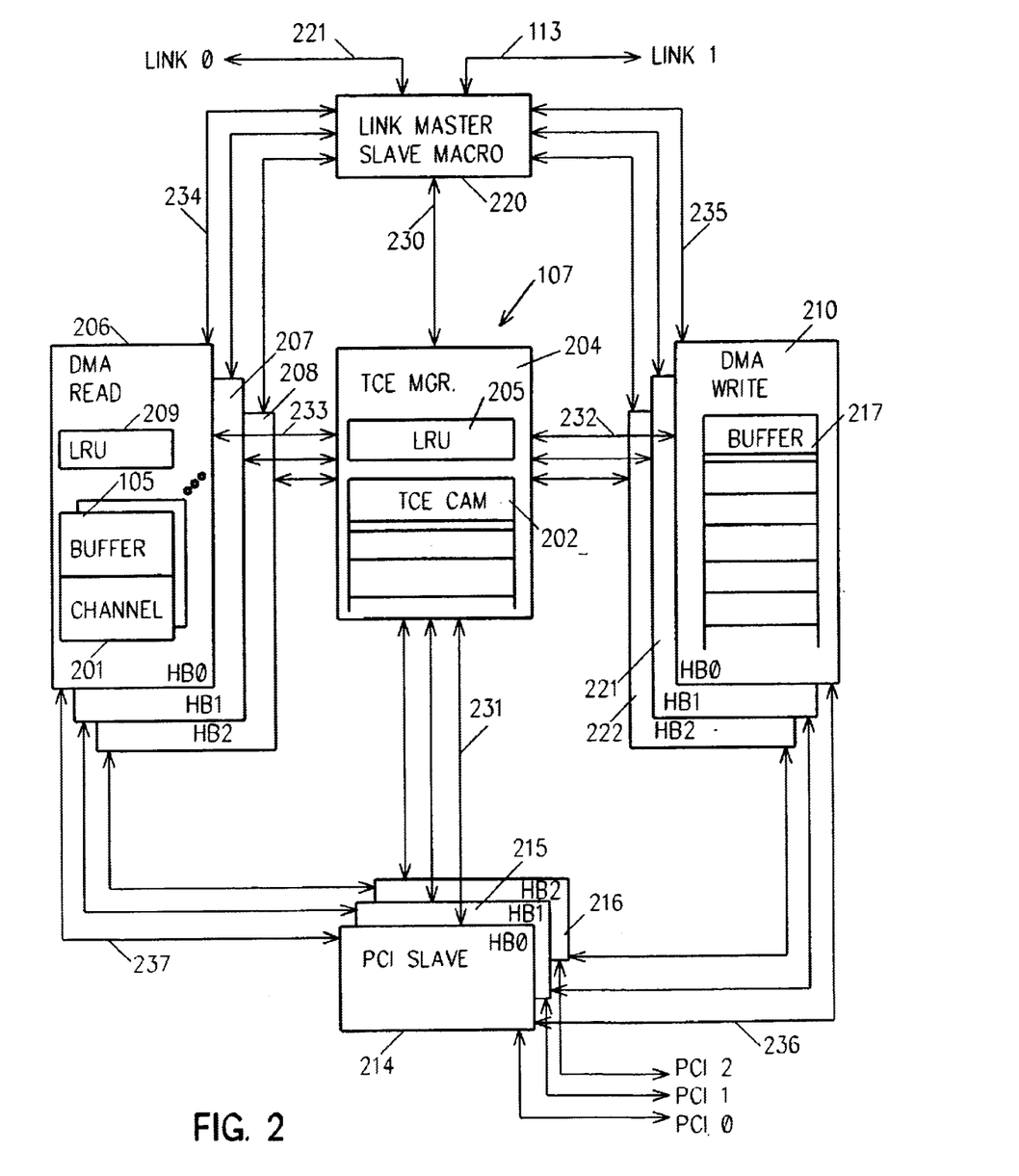
FIG. 2 is a system diagram of the host bridge chip 100 of FIG. 1.

Referring to FIG. 2, bridge 100 stores the mapping of PCI memory addresses 130 into system memory addresses 128 in a TCE cache 107. In this exemplary embodiment, this cache 107 is logically implemented as a 64 way fully associate content-addressable memory (CAM) 202. The TCE CAM 202 is located in a TCE manager functional unit 204 which interfaces with DMA read unit 206, DMA write unit 210, PCI slave unit 214, and link master/slave/macro functional units 220 over busses 233, 232, 231 and 230, respectively. The PCI slave unit 214 provides the chip interface and control logic for one of the three bridge chip 100 PCI busses 102 . . . 104 for DMA operations.

In this preferred embodiment, there are three PCI slave units 214–216 in bridge chip 100, one for each host bridge HB0, HB1, and HB2. The DMA read unit 206 provides data buffering in buffer 105 and control logic for the DMA read channels 201 contained within the buffer 105 of host bridge HB0 (corresponding to host bridge 123 of FIG. 1), and there are three DMA read units HB0 206, HB1 207, and HB2 208, one per PCI bus PCI0, PCI1, PCI2 (corresponding to PCI buses 102 . . . 104 in FIG. 1). The DMA write unit 210 provides data buffering in buffer 217 and control logic for the DMA writes for a host bridge 123 and there are three DMA write units 210–212 for the three host bridges HB0, HB1 and HB2, one per PCI bus PCI0, PCI1 and PCI2 (corresponding to PCI buses 102 . . . 104 of FIG. 1). The link master, slave and macro units 220 provide the full set of buffering and control logic necessary for interfacing to the two links 113 and 221 supported by this embodiment of host bridge chip 100. Link 221 may be used to connect additional additional host bridge chips 238, 239 to I/O hub 114, as is illustrated in FIG. 1. For example, link 221 is connected to link macro 223 in host bridge chip 239, which is connected via link 225 to link macro 224 in host bridge chip 238, which, in this embodiment, is connected via link 226 back to I/O hub and memory controller 114. This configuration allows multiple host bridge chips 100, 239 and 238 to connect to a single I/O hub and memory controller 114.

Referring further to FIG. 2, PCI slave units 214–216 are connected to the three PCI busses PCI0, PCI1 and PCI2 (corresponding to PCI buses 102–104 of FIG. 1) of host bridge chip 100 and receive DMA requests off of these busses. PCI slave units 214–216 are connected by buses including bus 231 to the TCE Manager unit 204 to request status on the availability of TCEs 136 cached in TCE CAM 202 associated with DMA operations. PCI address 130 information as well as command type is passed along this interface 231 to the TCE Manager unit 204. The TCE Manager unit 204 also tracks the state of any data cached within any of the DMA Read units 206, 207, 208 and the state of any data buffered within any of the DMA write units 210, 211, 212. Responses are sent back to the PCI slave 214 via bus 231 to indicate whether or not it should continue to process a current PCI operation or retry it.

If the operation is a DMA read, a cached TCE 136 is available in the TCE manager unit 103 and the requested data is available in the associated host bridge 100 DMA read unit's 206 data buffer 105, then the TCE Manager unit 204 informs the PCI slave unit 214 to read the data from the DMA read unit 206. This transfer takes place on the interface 237 between the PCI slave 214 and DMA read unit 206. The operation continues until the data buffered in buffer 105 in the DMA read unit 206 is exhausted or until a PCI bus master in the applicable I/O adapter 110 or 112 on PCI bus 104 has completed its request. (Each adapter 110, 112 includes a bus master for requesting or providing data with respect to PCI buses 102 or 104.) A buffer empty termination condition is indicated by the DMA read unit 206 back to PCI slave unit 214 when the PCI master 214 empties all of the DMA read unit's 206 buffers 105.

If the operation is a DMA read, a cached TCE 136 is available in the TCE manager unit and the requested data is not available in the DMA read unit's 206 data buffer 105, then the DMA read operation will be retried on PCI bus 104. If a read channel is already allocated for the operation and the buffer is waiting for data to arrive off of link 113, then no further action is taken until the data arrives. Once the data arrives, status information is passed on the connection from DMA read 206 to TCE manager units 204 updating the state information in the TCE CAM 107. The DMA read from the PCI bus 104 will then be honored on its next reissue.

Figure 3:
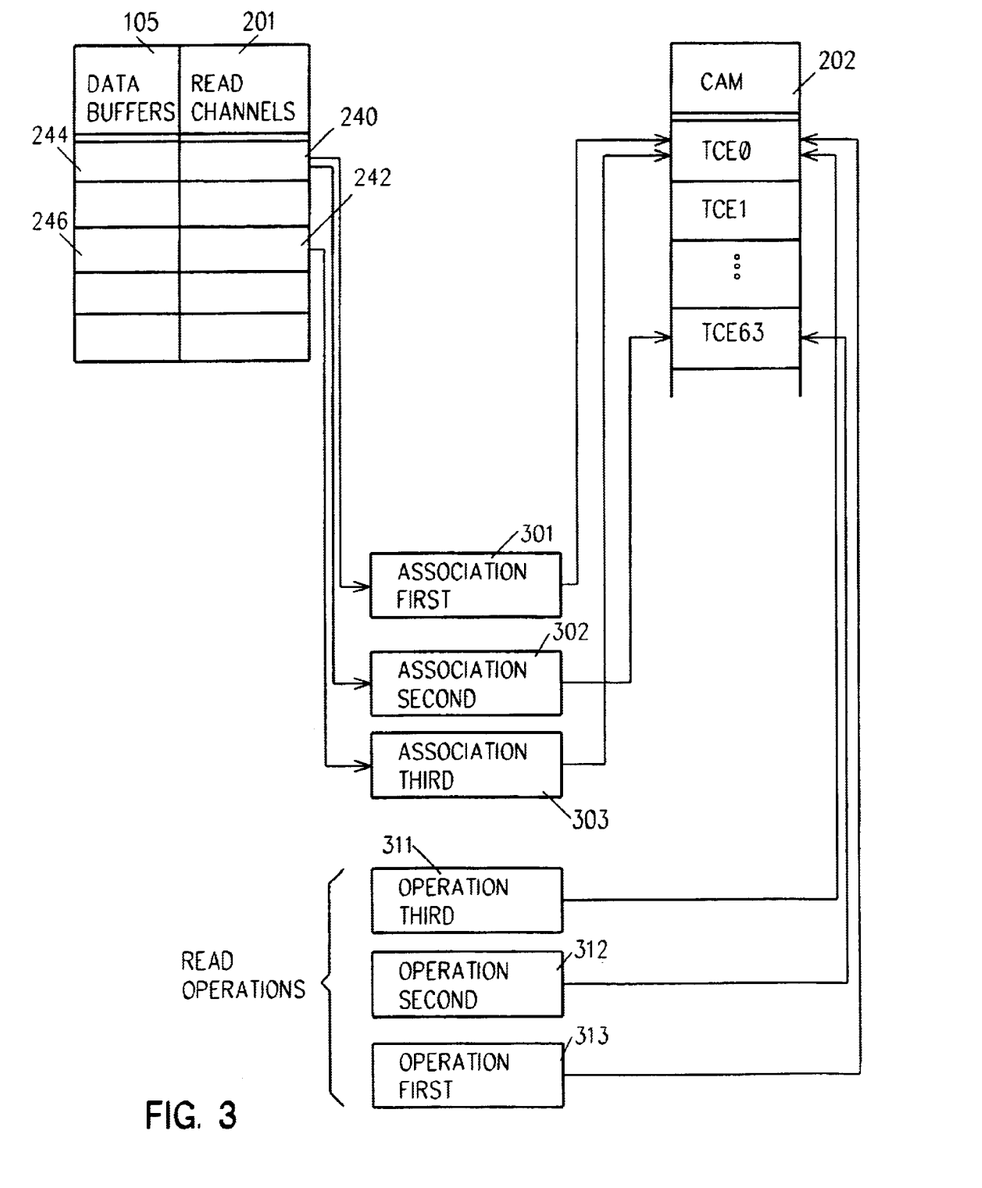
FIG. 3 is a flow diagram illustrating the operation of TCE CAM 202 and channels 201 of the host bridge 123 of FIG. 1.

If a read buffer 105 channel 201 is not already allocated for the operation, then the TCE manager unit 204 will request a new read channel from the DMA read unit 206. (As shown in FIG. 3, each data buffer 105 element has an associated read channel, or controller, 201.) If all read channels 201 have been allocated to previous DMA read operations, then LRU unit 209 selects the least recently used channel 201 for this DMA read operation, resulting in the discard of the previously buffered data for the selected channel. While the preferred method for selecting a channel is LRU, other selection strategies may be employed, such as random selection or least frequently used. In accordance with an exemplary embodiment, a DMA read unit 206 has a 4096 byte data buffer which is configurable into the following organizations:

1. 15 read channels containing two 128 byte sectors
2. 7 read channels containing four 128 bytes sectors
3. 3 read channels containing two 256 byte sectors.

The remaining space in the DMA read data buffer 105 is for other data bound for the PCI buses PCI0, PCI1 and PCI2

102–104. Once a read channel 201 is allocated, the DMA read unit 206 will generate the number of link 113 request packets necessary to fill all sectors of the channel with data if the original PCI command was a read multiple; otherwise only one link 113 request packet will be generated to fill one sector. These link 113 read request packets are passed on the connections 234 from the DMA read unit 206 to the link master units 220. When the data arrives on the connections 234 between the link slave 220 and DMA read units 206, status information is passed on the connection from DMA read unit 206 to TCE manager unit 204 over interface 233 updating the state information in the TCE CAM 107 similar to the previously described case. The DMA read from the PCI bus 102 will then be honored on its next reissue.

If the operation from PCI slave 214 is a DMA write, a cached TCE 136 is available in the TCE manager unit 204 and the DMA write unit 210 indicates to TCE manager 204 and PCI slave 214 that a data buffer is available for accepting DMA write data, then the TCE manager unit 204 informs the PCI slave unit 214 to send write data to the DMA write unit 210. This data is passed on the connection 236 from PCI slave 214 to DMA write unit 210. When a buffer full condition occurs, the DMA write unit 210 terminates the transfer with an indication on the connection 236 between DMA write unit 210 and PCI slave 214 units. DMA write data is then passed bus up 235 to the link master and macro units 220 for transmission on the link 113. At the completion of the write operation, the TCE is retained in the TCE CAM 202 for possible use by a subsequent DMA read operation or by a subsequent DMA write operation. The retention of the TCE for possible reuse by a DMA read operation results in particularly significant improvement in operation over previous implementations. Previously, TCE's retained at the completion of a write operation were available only for subsequent write operations.

In an exemplary embodiment, the DMA write buffer 217 is 1024 bytes and is divided into eight 128 byte sectors. These sectors correspond to the maximum link 113 write request packet generated by host bridge chip 100. Data is loaded into these sectors based on the system memory address offset 128 and are converted into the appropriate link packets supported by the link 113. This implementation supports 1–8 bytes on 8 byte boundaries, 16 byte aligned, 32 byte aligned, 64 byte aligned and 128 byte aligned link 113 write request packets.

If a TCE 136 is not cached in the TCE manager unit 204 for a DMA read or write request, then the TCE manager 204 will request a TCE fetch on the connections 230 between the TCE manager 204 and link master unit 220. Link master 220 will generate an 8 byte read request packet to the TCE address 144 specified by the TCE fetch request. When the TCE table entry 136 returns, it will be sent on the connections 230 from link slave 220 to TCE manager unit 204. A DMA read channel allocation request will then be sent to the DMA read unit 206 if the original command was a DMA read; if the original command was a DMA write, it may proceed immediately if the DMA write buffer 217 has available space.

Referring to Table 1, when a DMA read or write operation is initiated, TCE manager 107 checks to see if a translation element exists in TCE CAM 202; if not, the appropriate TCE is fetched from system memory 122; if room does not exist in TCE CAM 202 for the fetched TCE, LRU 205 mechanism determines which entry to discard from TCE CAM 202 to make room for the fetched TCE.

If the appropriate translation control element (TCE) is already in the TCE CAM 202, for a DMA read, TCE manager 204 determines if a channel is already assigned for the requested data and if that data is already in buffer 105. If no DMA read channel is already assigned, a DMA read channel is assigned based on LRU 209, resulting in the discard of a channel and its associated data; however, the associate TCE is retained in TCE CAM and available for association by a new channel upon a subsequent operation for the memory page referenced by the retained TCE. If the channel is assigned but no data is yet available, then the operation is retried until data is available.

Every channel, or buffer control, requires a TCE 136 to fetch data. A channel uses that TCE to address system memory 122 and load the associated data buffer 105 with data from that memory.

TABLE 1

READ ACTIONS SUMMARY

| TCE | DATA | CHANNEL | ACTION |
|-----|------|---------|--------|
| no  | no   | no      | 1. assign channel and fetch TCE |
| yes | no   | no      | 2. assign channel without fetching TCE |
| yes | no   | yes     | 3. retry (wait for data) |
| yes | yes  | no      | 4. impossible |
| yes | yes  | yes     | 5. provide data |

Action 2. "assign channel without fetching TCE" results in particularly significant improvement in operation over previous implementations.

This is illustrated in connection with FIG. 3. In response to a first read operation 313, a first association 301 establishes a link between read channel 240 and TCE0. In response to a second operation requiring access to system memory via TCE63, the contents of data buffer 244 are discarded, the association first 301 is broken, and channel 240 is linked by second association 302 to TCE63, however TCE0 is not discarded. Consequently, in response to a third operation 311 directed to TCE0, channel 242 may be associated via 303 with an available channel 242 and buffer 246.

Figure 4:
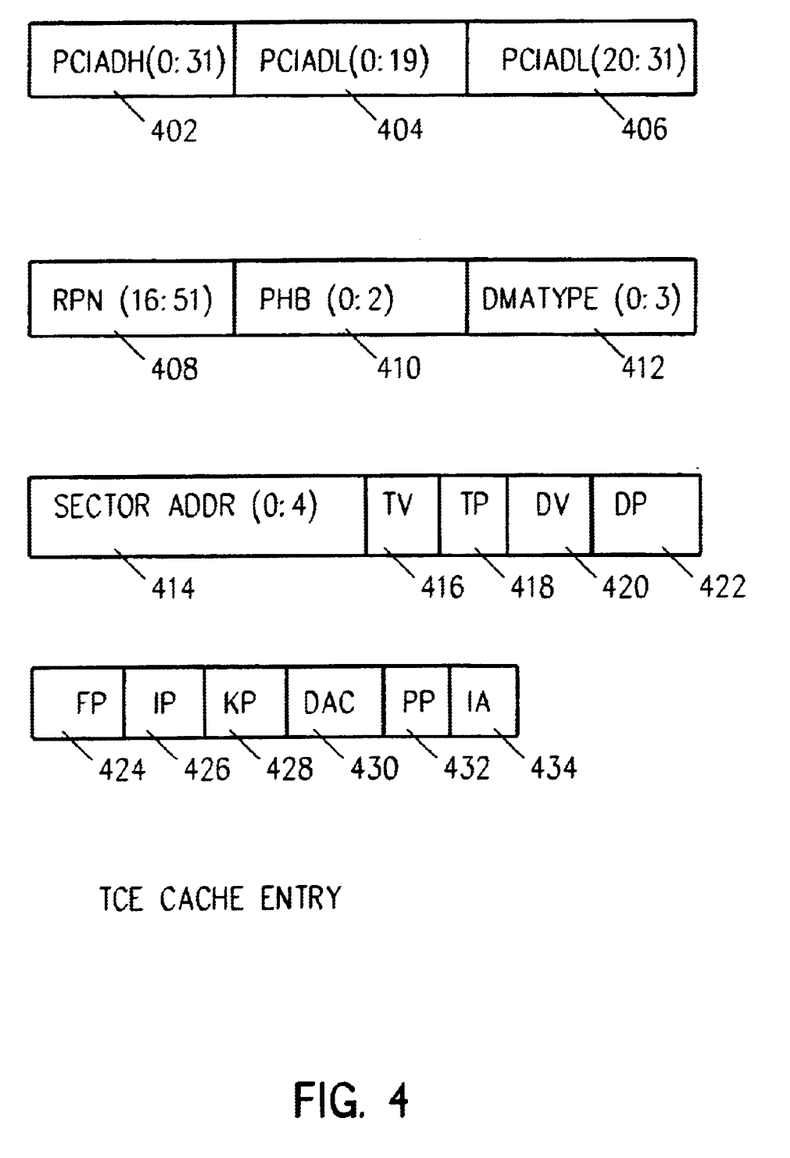
FIG. 4 is a format diagram of a TCE Cache 202 entry of FIG. 2.

FIG. 4 shows the format of an entry in the TCE cache 107. These bits are described in further detail below for a preferred embodiment. Other embodiments are possible which still incorporate the ideas presented as part of the invention. Of course, field widths could vary for different implementations with different memory structures and page sizes.

Following is a description of the function of each of the fields in a TCE cache 202 entry:

PCIadh(0:31) 402: This field 402 is only used for a dual-address-cycle operation associated with this entry. Dual-address-cycle provides 64 bit PCI address support and its use is controlled by the DAC bit 430 in the TCE cache 107. When active, the TCE translation function is disabled.

PcIadl(0:19) 404: PCI address bits 0:19 (according to the host bridge numbering convention as in FIG. 5) for the operation associated with this entry. These bits correspond to a 4 KB block in PCI memory address space.

PcIadl(20:31) 406: PCI address bits 20:31 for the operation associated with this entry. These bits form the byte address 142 in both PCI and system memory address space 130, 128, respectively. This address is updated at the end of a DMA read operation to point where the DMA read left off. This address along with the DV 420 and DP 422 bits indicate the state of buffered data within a DMA read channel 201.

RPN(15:61) 408: System memory 122 address bits 15:61 (aka RPN or real page number) provided from the TCE entry. This field is substituted for PCIadl(0:19) 404 when mapping a PCI memory address 130 into a system memory address 128 in the manner shown in FIG. 5.

PHB(0:2) 410: Identifies the PCI host bridge/bus 102–104 associated with this entry.

DMA type(0:3) 412: Identifies the operation associated with this entry as a read/write, read multiple, read line or write invalidate. This is primarily used for controlling the prefetch behavior for a DMA read channel. It also meets the PCI architectural requirement to match on the command type when a PCI bus 102–104 operation is retried.

Sector addr(0:4) 414: Pointer to a read channel data buffer 105 associated with this TCE cache 202 entry if a DMA read operation is active for this entry. This information along with the PHB field 410 fully identifies where the data resides for an active DMA read operation.

TV 416: TCE valid; the information contained in this entry is for an active operation or TCE 136.

TP 418: TCE pending; a TCE fetch is pending for the operation associated with this entry.

DV 420: Data valid; this bit indicates that the read channel associated with this entry contains valid data except in the "stale entry" state (see DP bit 422).

DP 422: Data pending; this bit indicates that the read channel associated with this entry is currently fetching the data needed for the DMA read operation; if this bit is off and the DV 420 bit is on, then the entry is "stale" and is waiting for an update to the byte offset 128 to indicate where the previous DMA read operation transaction stopped reading data.

FP 424: Forward progress; this bit tracks whether or not a DMA read or write operation has succeeded in transferring any bytes of data and is used to guarantee that an operation succeeds in transferring some data before control of a TCE cache 202 entry is relinquished to another operation.

IP 426: Invalidate pending; this bit indicates that a DMA write operation has passed a DMA read operation to the same 4 KB page in memory 122, but that the read has not yet made forward progress. Once the read makes forward progress, the TCE cache 107 entry is invalidated so that the effects of the new write are observable for future DMA read operations.

KP 428: Dkill pending; this bit indicates that a block dkill link 113 packet has been received but that an operation associated with the TCE cache 107 entry has yet to make forward progress. A Dkill packet is used for managing system coherency for TCEs cached within host bridge 100. Once the operation makes forward progress, the TCE cache 107 entry is invalidated so that subsequent DMA operations will use the new TCE 136 stored in system memory 122.

DAC 430: Dual address cycle; this bit indicates that the current operation is a DAC PCI command and no TCE translation should occur.

IA 434: Invalid address; this bit indicates that the DMA operation associated with this entry tried to access an illegal area of system memory. Memory limit registers (not shown) in host bridge chip 100 define accessible regions of system memory 122.

PP 432: Page protection; these bits are directly from the TCE 136 shown in FIG. 2 and provide further read/write access control to system memory.

The choice of a TCE cache 107 entry to use when a new operation arrives which is not already assigned to an entry is done using a 64 bit binary tree LRU 205. TCE cache entries which are not valid take precedence over the TCE cache entry chosen by the LRU 205. A TCE cache 107 entry is not eligible for reallocation to another operation until the forward progress (FP) bit 424 is set for that entry. The usage of TCE cache 107 entries per PCI host bridge (PHB) chip 100 is determined on a demand basis by the LRU replacement scheme. TCE cache 107 entry usage per operation type (read or write) is also determined on a demand basis by the LRU replacement scheme.

A cached TCE 136 is represented by the PCI address 130 and RPN 408. A cached TCE 136 is reusable across multiple operations within a PHB chip 100. A DMA read operation that uses the same TCE 136 as a DMA write operation can take over control of a TCE cache 107 entry, and vice versa. This is done by updating the PCIadl(20:31) 406 and DMA type 412 fields along with the FP, DV and DP bits 424, 420, and 422, respectively. The sector address 414 is also updated if the new operation is a DMA read to indicate the new read channel assigned to the operation.

A TCE cache 202 entry can also be reassigned between two read or two write operations in a similar manner.

The TCE cache 107 as previously mentioned is implemented as a content-addressable-memory 202. Every new PCI DMA operation is sent to the TCE Manager unit 204 to search the TCE CAM 202. The DMA address is compared against PCIadl(0:19)404, PCIadl(20:31) 406, DMA type (0:3) 412, PHB(0:2) 410 and the setting of the forward progress bit 424 is checked (also PCiadh(0:31) 402 is compared if the DMA operation is dual-address-cycle). If the forward progress bit 424 is off, all fields must compare in order for the DMA to proceed. This full compare is necessary to comply with PCI 2.1 Architecture.

If the forward progress bit 424 is on, the same matches must occur except:

Only bit 0 of the DMA type field 412 must compare (read/write).

PCIadl(25:31) in field 406 are ignored in the compare for a DMA read.

PCIadl(20:31) in field 406 are ignored in the compare for a DMA write.

When the forward progress bit 424 is on and the operation is already owned by the PHB chip 100 and a DMA read operation, the DMA read channel allows access (or reaccess) to data within a 128 byte window without reallocation of a DMA read channel 201. If a new DMA read operation falls outside of the 128 byte window but within the 4 KB page limit, a new read channel 201 is reallocated but the cached TCE 136 is reused, as previously described in connection with FIG. 3. When the forward progress bit 424 is on and the operation is already owned by the host bridge (PHB) 100 and a DMA write unit 210, a new DMA write operation reuses the existing cached TCE 136 if the new operation falls within the 4 KB page limit.

Block dkills from the links 113 are used to manage TCE 136 coherency at a system level. The hub chip 114 tracks the state of all TCE 136 entries cached within the host bridge chips 100 and issues block dkills when a TCE 136 has been updated in system memory 122. The hub 114 manages cached TCEs 136 in 128 byte blocks, and so a dkill when issued covers a 128 byte section of system memory representing 16 TCEs. When a block dkill packet arrives at host bridge 100, the address bits 16:40 of the Dkill packet are compared against the TCE address registers address bits 16:40 132 for each of the 3 PHBs 100. A 3 bit vector is formed indicating which PHBs 100 potentially have the TCE 136 cached, and this vector is sent to the TCE CAM 202 for comparison against the PHB(0:2) field 410 of all TCE CAM 202 entries. The TCE CAM 202 also receives address bits 41:56 of the block dkill link 113 packet to compare against PCIadl(0:15) bits in field 404. A match on both compares being equal results in either an immediate invalidation of the TCE entry 136 by turning off the TV bit 416 or a deferred invalidation indicated by the setting of the KP bit 428.

Advantages over the Prior Art

It is an advantage of the invention that there is provided an improved PCI host bridge apparatus and method.

It is a further advantage of the invention that there is provided a PCI host bridge apparatus and method which more efficiently utilizes limited resources available for caching translation control entries (TCEs).

It is a further advantage of the invention that there is provided a PCI host bridge apparatus and method in which TCEs are allocated to DMA reads or writes based on dynamic usage rather than fixed at design implementation.

It is a further advantage of the invention that there is provided a PCI host bridge apparatus and method in which reallocation of a read channel does not necessarily result in the loss of a TCE.

It is a further advantage of the invention that there is provided a PCI host bridge apparatus and method in which TCE's fetched and used for DMA write operations may be reused for subsequent DMA read operation.

It is a further advantage of the invention that there is provided a PCI host bridge apparatus and method in which repeated reads or continued reads do not necessarily suffer the latency of re-fetching a TCE when a channel reallocation occurs between read attempts.

It is a further advantage of the invention that there is provided a PCI host bridge apparatus and method through which an increased maximum sustained data rate may be achieved.

It is a further advantage of the invention that there is provided a PCI host bridge apparatus and method wherein DMA reads and writes that use the same TCE require only a single TCE fetch.

Alternative Embodiments

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as an IBM System 390, AS/400, PC or the like and pursuant to one or more, or a part of one or more, program elements, modules or objects generated from any programming language, such as C++, Java, Pl/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

We claim:

1. A system for sharing I/O address translation elements across multiple I/O bus bridges, comprising:
a translation element cache;
a cache manager;
a read unit including a plurality of channels; and
said cache manager for sharing said I/O address translation elements across said multiple I/O bus bridges by retaining in said cache a translation element associated in a first read operation with a discarded channel for one of said I/O bus bridges for association with a new channel responsive to a second read request for another of said I/O bus bridges for a memory page referenced by said translation element.

2. The system of claim 1, further comprising:
a write unit;
said cache manager being selectively operable for retaining in said cache a transaction element used in a first write operation for association with a channel responsive to a subsequent read request for a memory page referenced by said translation element.

3. A method for sharing cached I/O address translation elements across a plurality of I/O bus bridges, comprising the steps of:
responsive to a first read operation, associating a first read channel of a first of said I/O bus bridges with a first cached address translation element;
responsive to a second read operation, selectively associating said first read channel with a second cached address translation element associated with another of said I/O bus bridges without discarding said first address translation element from cache; and
responsive to a third read operation, selectively associating a second read channel with said first address translation element.

4. System for sharing I/O address translation elements across multiple I/O bus bridges, comprising:
a translation control element (TCE) manager;
a cache for storing translation control elements, said cache sharing said translation control elements for use by each of said I/O bus bridges;
a cache manager for selectively discarding translation control elements when required to translate an address for a new read or write operation;
a read unit comprising a plurality of channels for initiating fetches and associated data buffers for storing cached data, said read unit being responsive to said translation control elements for fetching memory content to said data buffers;
a write unit responsive to said translation control elements for storing information to memory; and
said TCE manager being operable responsive to read request for determining the status of said TCE cache, and said data buffers and channels of said read unit, and responsive to said status selectively assigning a channel, fetching a TCE entry, waiting for data, and providing data while retaining a TCE entry in cache associated with a discarded channel for association with a new channel responsive to a subsequent read request for a memory page referenced by a retained TCE entry.

5. The system of claim 4, said TCE manager being further operable
responsive to determining that said status comprises no TCE entry, no data in said data buffer, and no channel assigned with respect to said read request for assigning a channel and fetching TCE data;
responsive to determining that said status comprises TCE entry available in cache, but no data in said data buffer or channel assigned with respect to said read request for assigning a channel without fetching a new TCE;
responsive to determining that said status comprises TCE entry available in cache, no data in buffer, but channel assigned for waiting for data; and
responsive to determining that said status comprises TCE entry available in cache, data in buffer, and channel assigned for providing data in response to said read request.

6. The system of claim 5, said cache manager being further operable responsive a fetch of a TCE entry for which room does not exist in said cache, for selecting a TCE entry for discard to make room for the fetched TCE entry.

7. The system of claim 4, said TCE manager being responsive to completion of a write operation for discarding the associated channel while retaining the associated TCE entry for possible reuse.

8. Method for sharing I/O address translation elements across multiple I/O bus bridges, comprising:
storing translation control (TCE) elements in a cache shared across said multiple I/O bus bridges; and
responsive to a read request, selectively assigning a channel, fetching a TCE entry, waiting for data, and providing data while retaining a TCE entry in cache associated with a discarded channel for association with a new channel responsive to a subsequent read request for a memory page referenced by a retained TCE entry.

9. A bridge apparatus, comprising:
a plurality of input/output device buses;
a plurality of bridge functional units;
each said bridge functional unit including a plurality of read buffer/channel pairs, a buffer controller, a write buffer, and an interface to at least one of said input/output device buses;
a communication link interface;
a translation element cache, said cache sharing said translation elements for use by each of said bridge functional units;
a cache manager; and
said cache manager being selectively operable for allocating translation elements in said cache across said plurality of bridge functional units based on dynamic usage.

10. The bridge apparatus of claim 9, said cache manager being further operable responsive to reallocation of a read channel for selectively retaining a translation element associated with the reallocated read channel in said cache for subsequent use.

11. The bridge apparatus of claim 9, said translation element cache being shared amongst a plurality of bridge functional units, with each translation element entry in said cache including indicia identifying the bridge functional unit to which it is currently assigned.

12. The bridge apparatus of claim 9, further comprising an address register for each said bridge functional unit pointing to a corresponding translation control element table in system memory.

13. The bridge apparatus of claim 12, entries in said cache being operable for mapping PCI memory addresses into system memory address.

14. The bridge apparatus of claim 13, further comprising a plurality of communication link interfaces for accessing a plurality of processor complexes.

15. A method for operating a bridge apparatus with a plurality of host bridges, comprising the steps of:
   selectively allocating translation elements in cache based on dynamic usage; and
   responsive to reallocation of a read channel associated with one of said host bridges, selectively retaining a translation element in said cache associated with said reallocated read channel associated with another of said host bridges for subsequent use.

16. A program storage device readable by a machine, tangibly embodying a program of instructions executable by a machine to perform method steps for sharing cached I/O address translation elements, said method steps comprising:
   responsive to a first read operation, associating a first read channel with a first cached address translation element;
   responsive to a second read operation, selectively associating said first read channel with a second cached address translation element without discarding said first address translation element from cache;
   responsive to a third read operation, selectively associating a second read channel with said first address translation element.

17. A program storage device readable by a machine, tangibly embodying a program of instructions executable by a machine to perform method steps for sharing I/O address translation elements across multiple I/O bus bridges, said method steps comprising:
   storing translation control (TCE) elements in a shared cache, said cache sharing said translation control elements for use by each of said multiple I/O bus bridges;
   responsive to a read request, selectively assigning a channel, fetching a TCE entry, waiting for data, and providing data while retaining a TCE entry in cache associated with a discarded channel for association with a new channel responsive to a subsequent read request for a memory page referenced by a retained TCE entry; and
   retaining in said cache a transaction element used in a first write operation for association with a channel responsive to a subsequent read request for a memory page referenced by said translation element.

18. A program storage device readable by a machine, tangibly embodying a program of instructions executable by a machine to perform a method for operating a bridge apparatus with a plurality of host bridges, said method comprising:
   selectively allocating translation elements in cache based on dynamic usage; and
   responsive to reallocation of a read channel associated with one of said host bridges, selectively retaining a translation element in said cache associated with said reallocated read channel associated with another of said host bridges for subsequent use.

19. A computer program product or computer program element for operating a bridge apparatus with a plurality of host bridges according to the steps of:
   selectively allocating translation elements in cache based on dynamic usage; and
   responsive to reallocation of a read channels associated with one of said host bridges, selectively retaining a translation element in said cache associated with said reallocated read channel associated with another of said host bridges for subsequent use.

20. An article of manufacture comprising:
   a computer useable medium having computer readable program code means embodied therein for sharing I/O address translation elements across multiple I/O bus bridges, the computer readable program means in said article of manufacture comprising:
      computer readable program code means for storing translation control (TCE) elements in a shared cache, said cache sharing said translation control elements for use by each of said I/O bus bridges; and
      computer readable program code means responsive to a read request for selectively assigning a channel, fetching a TCE entry, waiting for data, and providing data while retaining a TCE entry in cache associated with a discarded channel for association with a new channel responsive to a subsequent read request for a memory page referenced by a retained TCE entry.

21. The system of claim 1, said I/O address translation elements comprising translation control entries (TCE) for mapping I/O space to system memory space.

22. System for sharing I/O address translation elements across multiple I/O bus bridges, comprising:
   a translation control element (TCE) manager;
   a cache for storing translation control elements;
   a cache manager for selectively discarding translation control elements when required to translate an address for a new read or write operation,
   a read unit comprising a plurality of channels for initiating fetches and associated data buffers for storing cached data, said read unit being responsive to said translation control elements for fetching memory content to said data buffers;
   a write unit responsive to said translation control elements for storing information to memory;
   said TCE manager being operable responsive to read request for determining the status of said TCE cache, and said data buffers and channels of said read unit, and responsive to said status selectively assigning a channel, fetching a TCE entry, waiting for data, and providing data while retaining a TCE entry in cache associated with a discarded channel for association with a new channel responsive to a subsequent read request for a memory page referenced by a retained TCE entry;
   said TCE manager being further operable
      responsive to determining that said status comprises no TCE entry, no data in said data buffer, and no channel assigned with respect to said read request for assigning a channel and fetching TCE data;
      responsive to determining that said status comprises TCE entry available in cache, but no data in said data buffer or channel assigned with respect to said read request for assigning a channel without fetching a new TCE;
      responsive to determining that said status comprises TCE entry available in cache, no data in buffer, but channel assigned for waiting for data; and
      responsive to determining that said status comprises TCE entry available in cache, data in buffer, and channel assigned for providing data in response to said read request.

23. The system of claim 22, said cache manager being further operable responsive to a fetch of a TCE entry for which room does not exist in said cache, for selecting a TCE entry for discard to make room for the fetched TCE entry.

* * * * *